(12) United States Patent
Ishiwari et al.

(10) Patent No.: US 6,994,908 B1
(45) Date of Patent: Feb. 7, 2006

(54) POLYTETRAFLUOROETHYLENE LAMINATED ARTICLE

(75) Inventors: Kazuo Ishiwari, Settsu (JP); Tatsuro Uchida, Settsu (JP); Masahiko Yamada, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/763,093

(22) PCT Filed: Jul. 22, 1999

(86) PCT No.: PCT/JP99/03915

§ 371 (c)(1),
(2), (4) Date: Feb. 16, 2001

(87) PCT Pub. No.: WO00/10805

PCT Pub. Date: Mar. 2, 2000

(30) Foreign Application Priority Data

Aug. 18, 1998 (JP) ................................. 10-231336

(51) Int. Cl.
B32B 27/12 (2006.01)
B32B 27/30 (2006.01)

(52) U.S. Cl. ...................... 428/422; 442/289
(58) Field of Classification Search ............... 428/421, 428/422; 442/289, 397
See application file for complete search history.

(56) References Cited

U.S. PATENT DOCUMENTS

| | | | |
|---|---|---|---|
| 5,096,473 A * | 3/1992 | Sassa et al. | ..... 55/302 |
| 5,189,721 A * | 2/1993 | Sayegh et al. | ..... 385/114 |
| 5,261,442 A * | 11/1993 | Kingsford et al. | ..... 137/312 |
| 5,296,287 A | 3/1994 | Ribbans | |
| 5,374,473 A | 12/1994 | Knox et al. | |
| 5,470,655 A * | 11/1995 | Hirai | ..... 428/364 |
| 6,080,472 A * | 6/2000 | Huang et al. | ..... 428/315.5 |

FOREIGN PATENT DOCUMENTS

| | | |
|---|---|---|
| CA | 2158805 A1 | 4/1996 |
| EP | 0 202 996 A2 | 11/1986 |
| EP | 0 711 657 A2 | 5/1996 |
| JP | 62-23751 | 1/1987 |
| JP | 2-208037 | 8/1990 |
| JP | 8-183140 | 7/1996 |
| JP | 10-202803 | 8/1998 |

OTHER PUBLICATIONS

English translation of International Preliminary Examination Report for PCT/JP99/03915 dated Nov. 7, 2000.
Takaomi Satokawa, Fluoride Resin Handbook, Nov. 30, 1990, pp. 44-45, 1st Edition, The Nikkan Kogyo Shimbun, Ltd.
Supplementary European Search Report for EP 99 93 1476 dated Aug. 19, 2004.
Patent Abstracts of Japan, vol. 1995, No. 04, May 31, 1995 & JP 7 001657 A (Nisshin Chem Kogyo KK), Jan. 6, 1995.

* cited by examiner

Primary Examiner—Ramsey Zacharia
(74) Attorney, Agent, or Firm—Sughrue Mion, PLLC

(57) ABSTRACT

To provide a PTFE laminated article having a sufficient adhesive strength and a PTFE backing sheet having a low permeability, in which a specific weight of a PTFE sheet can be maintained high. A specific weight of the PTFE sheet is maintained at 2.175 or more by carrying out thermo-fusing of the PTFE sheet and a film or sheet of heat-meltable resin such as PFA after interposing a layer of PTFE fine particles between them or by carrying out treatment for preventing a rapid temperature lowering after the thermo-fusing without interposing the layer of PTFE fine particles.

7 Claims, 2 Drawing Sheets

POLYTETRAFLUOROETHYLENE LAMINATED ARTICLE

TECHNICAL FIELD

The present invention relates to a polytetrafluoroethylene (PTFE) laminated article having a low permeability to a chemical solution, namely a reduced permeability to a chemical solution. The laminated article is useful for a backing sheet to be used for a chemical solution storage vessel or tank, lining of piping, and the like.

BACKGROUND ART

Various chemical solutions are widely used as a starting solution or a detergent not only in production of semiconductors but also in various chemical plants. Among the chemical solutions, there are those being high in reactivity or being corrosive. For vessels and pipes for storing or transporting such chemical solutions, usually a laminated article called a backing sheet is lined on inner walls thereof. A surface of the backing sheet contacting a chemical solution must be made of a material being excellent in chemical resistance, and usually a sheet of fluorine-containing resin being excellent in chemical resistance, particularly a sheet of PTFE is used.

A typical backing sheet which has been used so far is one made by adhering a heat resistant woven fabric of glass fiber or carbon fiber to a PTFE sheet. However since it is difficult to allow the PTFE sheet to adhere to other material, a heat-meltable tetrafluoroethylene/perfluoro(alkyl vinyl ether) copolymer (PFA) film is interposed between the heat resistant woven fabric and the PTFE sheet and then heating is carried out for thermo-fusing at a temperature of not less than a melting point of PTFE. At the time of heating for thermo-fusing, PTFE is also melted unavoidably, and as a result, lowering of crystallinity, namely lowering of a specific weight arises. On the other hand, the higher the cystallinity (higher specific weight) of PTFE is, the lower the permeation of a chemical solution through PTFE is. Therefore it is better to avoid the heating which causes lowering of the crystallinity of PTFE. However if the heating is stopped in a state of the crystallinity of PTFE remaining to a certain extent, a required adhesive strength cannot be obtained even if PFA is interposed.

In the conventional backing sheet, unintentionally a sheet of PTFE having a lowered crystallinity and a small specific weight was used as a starting material, or even if PTFE having a high crystallinity and a high specific weight was used as a starting material, lowering of crystallinity of the PTFE sheet by heating was obliged to be accepted.

Anyway, there was neither a backing sheet nor a laminated article of PTFE having an average specific weight of not less than 2.175 and an adhesive strength of practicable level.

DISCLOSURE OF INVENTION

The first object of the present invention is to provide the PTFE laminated article being excellent in a low permeability to a chemical solution.

Also it is another object of the present invention to provide the backing sheet having enough adhesive strength and a reduced permeability to a chemical solution.

Further an object of the present invention is to provide a method of producing the PTFE laminated article having a reduced permeability to a chemical solution, in which a heating time can be shortened and production steps can be reduced.

Those objects can be achieved by a laminated article having a layered structure comprising a PTFE sheet having an average specific weight of not less than 2.175 and a heat-meltable resin layer or a layered structure obtained by laminating a PTFE sheet having an average specific weight of not less than 2.175 and a heat resistant woven fabric by interposing a heat-meltable resin layer therebetween.

The obtained laminated article has an adhesive strength of not less than 2 kgf/cm in a peel strength between the PTFE sheet and the heat-meltable resin layer, which is a strength equal to or more than that of a conventional laminated article comprising a PTFE sheet having an average specific weight of less than 2.175.

Hereupon an average specific weight means a specific weight of a whole PTFE sheet including a portion (layer) thereof having a lowered specific weight which arises as a result of heating.

When the laminated article of the present invention is used, for example, as a backing sheet, in order to make a free surface of the outermost PTFE sheet smooth, it is preferable to heat-treat the free surface of the PTFE sheet at a temperature of not less than a melting point of PTFE. In this surface smoothing treatment, it is preferable that the sheet of PTFE is a sheet of PTFE modified with perfluoro(alkyl vinyl ether) (PAVE).

The laminated article of the present invention can be produced by thermo-fusing by heating of a PTFE sheet, preferably a PTFE sheet having a specific weight of more than 2.175 and a heat-meltable resin film or sheet while interposing between them a layer of un-sintered PTFE having a melt energy of not more than 65 J/g, for example, a layer of fine particles of PTFE homopolymer or PTFE modified with hexafluoropropylene (HFP) and/or perfluoro (alkyl vinyl ether) (PAVE).

The layer of PTFE fine particles can be applied in the form of dispersion obtained by emulsion polymerization or in the form of film obtained by drying the dispersion into a powder and then forming the powder into a film.

Also the laminated article can be produced by heating for thermo-fusing of the PTFE sheet and heat-meltable resin film without interposing the layer of PTFE fine particles. In that case, in order to make a specific weight of the PTFE sheet high, it is necessary to prevent a rapid lowering of temperature after the heating for thermo-fusing. By taking this measure for preventing a rapid lowering of temperature, crystallization of molten PTFE advances sufficiently and the specific weight of PTFE can be made higher.

In order to prevent a rapid temperature lowering, for example, it is proper to hold a temperature within a range of less than a melting point of PTFE and not less than 300° C. A holding time may be enough as far as crystallization of molten PTFE advances sufficiently, and a time interval of 5 to 20 minutes can be adopted.

This measure for preventing a rapid temperature lowering can be taken also in the case of interposing the layer of PTFE fine particles.

It is preferable that the heating is carried out from the side of heat resistant woven fabric, namely from the side of heat-meltable resin film or sheet, and that the heating is stopped at the time when an un-melting layer remains in the PTFE sheet.

Particularly in the case of using as a backing sheet, it is preferable that a surface of PTFE sheet opposite to the laminated surface, namely a surface contacting a solution is heat-treated at a temperature of not less than a melting point of PTFE to make the surface smooth. The heat-treating may be carried out at any timing before or after the heating for thermo-fusing of the laminated article or at the same time as the thermo-fusing.

BEST MODE FOR CARRYING OUT THE INVENTION

Figure 1:
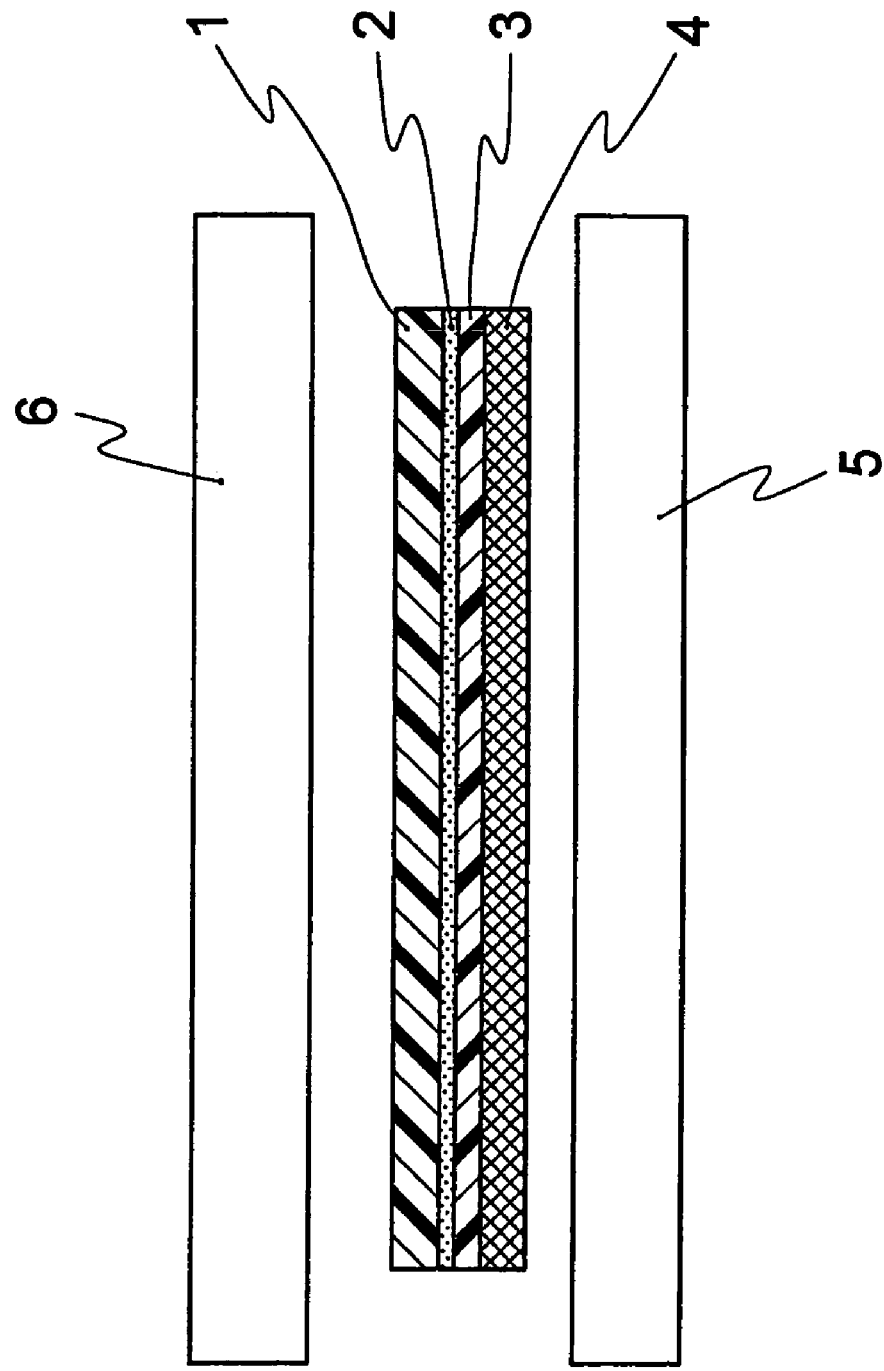
FIG. 1 is a diagrammatic cross-sectional view for explaining one embodiment of the method for producing the PTFE laminated article of the present invention.

As mentioned above, the PTFE laminated article of the present invention can be produced by thermo-fusing by heating of a PTFE sheet and a heat-meltable resin film or sheet after interposing between them a layer of fine particles of un-sintered PTFE having a melt energy of not more than 65 J/g (hereinafter referred to as "un-sintered PTFE" unless otherwise noted) (First production method). The steps of the first production method are explained below in detain, but the present invention is not limited to them.

At first a dispersion of un-sintered PTFE is applied on a PTFE sheet of about 1 mm to about 4 mm thick, followed by drying to form a layer of fine particles of un-sintered PTFE on the PTFE sheet. A particle size of fine particles of un-sintered PTFE is from about 0.1 µm to about 5 µm, preferably 0.1 to 0.5 µm from the viewpoint of a small melt energy and an increase in thermal conductivity. A concentration of the un-sintered PTFE dispersion is from about 30% by weight (hereinafter referred to as "%") to about 70%, preferably from about 30% to about 65% from the viewpoint of stabilizing the dispersion and enhancing a coatability. A coating amount is from about 10 g/m$^2$ to about 160 g/m$^2$, preferably from about 15 g/m$^2$ to about 100 g/m$^2$ in a dry weight. When the coating amount is too small, non-uniform coating arises easily, and when too much, releasing of fine particles easily arises. The both cases are not preferred.

A coating method is not limited particularly. For example, a spray coating method, brush coating method and the like can be employed. For drying, air drying or forced drying by heating may be employed.

Instead of the un-sintered PTFE dispersion, a dispersion of un-molten tetrafluoroethylene/perfluoro(alkyl vinyl ether) copolymer (PFA) may be used, or an un-sintered PTFE film may be applied. The un-sintered PTFE film can be produced, for example, by coagulating a PTFE dispersion to form into a fine powder and then rolling the powder.

Then the heat-meltable resin film or sheet is overlaid on the layer (film) of un-sintered PTFE fine particles on the PTFE sheet, and as case demands, after a heat resistant woven fabric is overlaid thereon, heating is carried out from the side of heat-meltable resin. In the present invention, this heating is important.

A heating temperature is not less than a melting point of PTFE (about 327° C. to about 345° C.), preferably about 360° C. to about 390° C., and it is important to stop the heating in a state that an un-molten portion (layer) remains in the PTFE sheet at the mentioned temperature. Namely an amount of heat to be applied may be one in which crystals remain in the PTFE sheet. If the crystals are molten completely, a specific weight is greatly lowered below 2.175, and permeability to a chemical solution is increased.

The heating time varies depending on a heating temperature, a thickness of the PTFE sheet, kind and thickness of heat-meltable resin, a thickness of heat resistant woven fabric, and the like, and may be selected experimentally or calculated from a degree of crystallization. For example, the heating time may be from 3 to 5 minutes in the case where a specific weight, thickness and heating temperature of the PTFE sheet are 2.189, 3 mm and 380° C., respectively.

Whether or not the un-molten portion remains partly can be recognized by seeing a cut surface of the PTFE sheet. Namely the PTFE sheet having a high crystallinity is white and opaque before heating, and becomes transparent when crystals are molten. Accordingly on the cut surface, there is a transparent portion (layer) at the side of heat-meltable resin and a white opaque layer remains at the non-heating side.

The method of heating for thermo-fusing may be such that, as shown in FIG. 1, a PTFE sheet 1, a layer 2 of un-sintered PTFE fine particles, a heat-meltable resin film or sheet 3 and as case demands, a heat resistant woven fabric 4 are arranged in that order, and a heating plate 5 and a supporting plate 6 are arranged at the side of heat resistant woven fabric 4 and PTFE sheet 1, respectively and then pressing with the heating plate 5 and supporting plate 6 and heating of the heating plate 5 to a temperature of not less than a melting point of PTFE are carried out.

Figure 2:
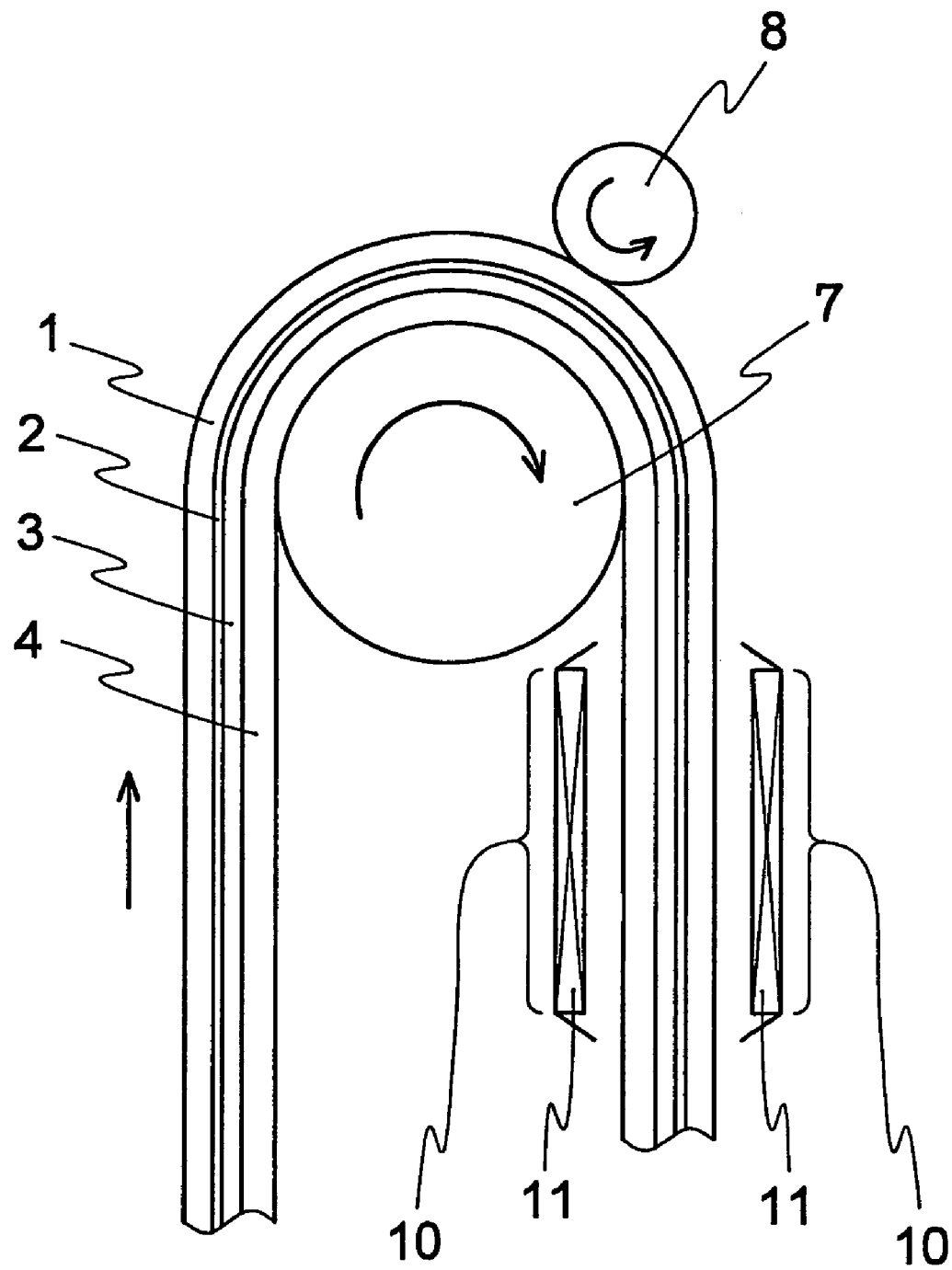
FIG. 2 is a diagrammatic cross-sectional view for explaining another embodiment of the method for producing the PTFE laminated article of the present invention.

Also as shown in FIG. 2, the laminated article may be produced continuously by winding a layered article comprising a PTFE sheet 1, a layer 2 of un-sintered PTFE fine particles, a heat-meltable resin film or sheet 3 and as case demands, a heat resistant woven fabric 4, in that order on a heating roll 7 heated to a temperature of not less than a melting point of PTFE so that the heat resistant woven fabric 4 contacts a surface of the heating roll 7 and then heating for thermo-fusing while pressing with a press roll 8. In FIG. 2, numeral 10 represents a crystallization zone, and numeral 11 represents a heater.

When the un-sintered PTFE dispersion is used, the layer 2 of un-sintered PTFE fine particles may be formed by applying the un-sintered PTFE dispersion on the PTFE sheet 1 and then drying, as mentioned above, or by applying the un-sintered PTFE dispersion on the heat-meltable resin film or sheet 3 and then drying.

A pressure for pressing may be selected in a range of from about 0.1 MPa to about 0.15 MPa. It is preferable from the viewpoint of making crystallinity high that after the heating, releasing of pressure and slow cooling to room temperature are carried out. The supporting plate 6 and press roll 8 basically need not be heated, but from a point of eliminating distortion of the laminated article, may be heated to a temperature of less than a melting point of PTFE, preferably to a temperature lower by 15° to 35° C. than the melting point of PTFE.

Then each material is explained below.

The PTFE sheet to be used in the present invention need to have a high crystallinity, namely a specific weight exceeding 2.175, particularly not less than 2.178, preferably 2.178 to 2.210. If the specific weight is small, permeability to a chemical solution increases and the objects of the present invention cannot be achieved. The PTFE sheet having such a high crystallinity can be obtained by a method described, for example, in the specification of PCT/JP98/01116, namely by producing a sintered article through a rotation sintering method in which a PTFE molded article obtained by compression-molding a PTFE powder is sintered while being rotated, and then cutting the obtained sintered article to form into a sheet. On the other hand, since a sheet obtained by cutting a PTFE sintered article produced by conventional method is waved greatly, the PTFE sheet must be made flat previously by heating in order to make a laminated article, and for that reason, a crystallinity of PTFE is lowered before lamination. However in the rotation sintering method, a PTFE sheet being uniform and having a high crystallinity can be obtained, and yet a sheet obtained by cutting is flat and lamination with other material is easy. Further flattening treatment by heating is not necessary and there is no fear of lowering of crystallinity before the lamination.

The PTFE powder as a starting material is a tetrafluoroethylene (TFE) homopolymer or PTFE modified with other fluoromonomer. In the modified PTFE, a mole ratio of TFE and other fluoromonomer may be 95:5 to 99.999:0.001. Examples of the modified PTFE are, for instance, PAVE-modified PTFE modified with perfluoro(alkyl vinyl ether) (PAVE), HFP-modified PTFE modified with hexafluoropropylene (HFP), and the like. Perfluoro(alkyl vinyl ether) (PAVE) may be a compound represented by the formula (I):

wherein $R_f$ is an organic group which has carbon atom and fluorine atom essentially, does not have hydrogen atom and may have oxygen atom.

The $R_f$ group of perfluoro(alkyl vinyl ether) (I) may be a perfluoroalkyl group having 1 to 10 carbon atoms, a perfluoro(alkoxyalkyl) group having 4 to 9 carbon atoms, a group represented by the formula (II):

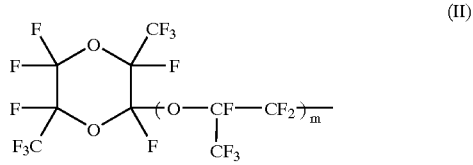

wherein m is 0 or an integer of 1 to 4, or a group represented by the formula (III):

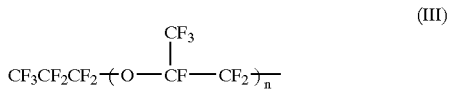

wherein n is 0 or an integer of 1 to 4.

Among them, PAVE-modified PTFE is preferred because it has a large crystallinity and a specific weight exceeding 2.175 and is small in permeability to a chemical solution.

A thickness of the PTFE sheet varies depending on intended application and is usually from 1 to 4 mm, and is from about 2 mm to about 4 mm when the sheet is used as a backing sheet.

The un-sintered PTFE dispersion for forming a layer of un-sintered PTFE fine particles can be obtained by emulsion-polymerizing TFE solely or in the presence of a small amount of PAVE and/or HFP. It is preferable that a melt energy is not more than 65 J/g, particularly 30 to 50 J/g from the viewpoint of enhancing thermal conductivity. From the viewpoint of excellent thermo-fusing property, PAVE-modified PTFE is preferred.

The heat-meltable resin film or sheet may be one which is capable of thermo-fusing with the PTFE sheet. Examples thereof are olefin resins; aromatic resins such as PPS, PES and PEEK; heat-meltable fluorine-containing resins such as TFE/PAVE copolymer (PFA) and TFE/hexafluoropropylene copolymer (FEP), and the like which have a melting point approximate to that of PTFE. Among them, from the viewpoint of having properties analogous to those of PTFE and having good adhesion to PTFE, preferred are heat-meltable fluorine-containing resins, and particularly for a backing sheet, PFA, FEP, and the like are preferred.

The heat-meltable resin is usually used as an adhesive layer for allowing a PTFE sheet to adhere to other material (for example, heat resistant woven fabric). A laminated article produced by allowing a PTFE sheet to adhere to a heat-meltable resin sheet or a functional laminated article produced by laminating a heat-meltable resin film to a PTFE sheet may be used. Therefore a thickness thereof may be optionally selected depending on purpose. For example, when the heat-meltable resin is used as an adhesive layer of a backing sheet, a thickness thereof may be from about 10 $\mu$m to about 300 $\mu$m.

Then explained below is a method (Second production method) for obtaining a laminated article by making a pre-laminated article by thermo-fusing a PTFE sheet and a heat-meltable resin film directly or by interposing a layer of PTFE fine particles therebetween and then allowing the pre-laminated article to stand in a state of not causing a rapid temperature lowering to accelerate crystallization of molten PTFE.

The thermo-fusing treatment of the PTFE sheet and heat-meltable resin film may be the same as in the first production method, but a heating time may be slightly longer. The second production method has a feature of sufficiently carrying out re-crystallization of molten PTFE in the PTFE sheet melted by thermo-fusing treatment. The sufficient re-crystallization of PTFE can restore the PTFE sheet having a high specific weight. Namely if the molten PTFE is cooled rapidly or allowed to stand as it is, crystallization is not advanced, and also generated crystals are incomplete ones. As a result a specific weight is not increased.

Therefore in the second production method, rapid lowering of temperature, which results in lowering of a specific weight, is prevented. For preventing rapid temperature lowering, there is a method of allowing the molten PTFE to stand at a temperature of lower than a melting point (from about 327° C. to about 345° C.) of PTFE and not less than 300° C. for a period of time for advancing crystallization sufficiently. This residence time varies depending on a temperature at thermo-fusing, a thickness of PTFE sheet, a specific weight of starting PTFE sheet, etc., and may be selected in a range of from 5 to 20 minutes, preferably 5 to 10 minutes. For example, when a 3 mm thick PTFE sheet having a specific weight of 2.189 is thermo-fused at 380° C., it is possible to prevent the specific weight of PTFE sheet from lowering to less than 2.175 by holding the sheet at a temperature of 300° to 310° C. for 7 to 9 minutes.

As concrete means for preventing such a rapid temperature lowering, as shown in FIG. 2, there is a method of providing crystallization zones represented by numeral 10 downstream of the heating roll 7 at both sides of the PTFE sheet 1 and heat resistant woven fabric 4 and carrying out a temperature control of the thermo-fused PTFE sheet 1 with heaters 11 in the crystallization zones 10 lest a rapid temperature lowering should arise. Also the crystallization zone may be designed so as to be in the form of crystallization chamber covering the whole laminated article though it is not illustrated.

The temperature control in the crystallization zone may be carried out by maintaining a constant temperature, continuously lowering the temperature or lowering the temperature by stages (for example, 350° C. zone, 330° C. zone and then 310° C. zone).

When heating for thermo-fusing from the side of heat-meltable resin film (from the side of heat resistant woven fabric), means for preventing a rapid temperature lowering may be provided at the side of heat-meltable resin film.

The laminated article of the present invention basically may have a two-layered structure comprising a PTFE sheet and a heat-meltable resin film or sheet. Also in case of a composite laminated article produced by combining other material by using a heat-meltable resin as an adhesive layer as mentioned above, an effect can be exhibited especially.

In the case of applications making the best use of heat resistance of PTFE, for example, in the case of a backing sheet, examples of the other material are heat resistant woven fabrics, for example, woven fabrics of glass, carbon, polyamideimide, boron nitride, and the like.

The laminated article of the present invention has a low permeability to a chemical solution and is useful as a backing sheet for lining of various storing and transporting vessels, tank, pipe line, and the like. In addition, the laminated article is suitable for mold releasing and sliding applications by making the best use of non-sticking property and friction property of PTFE.

In case of use for production of semi-conductors in which a very high cleanliness is required, it is not enough only to prevent a chemical solution from penetrating and oozing out, and it is necessary to protect the chemical solution itself from contamination. For example, in case where the PTFE laminated article of the present invention (a surface thereof contacting a solution is a PTFE sheet) is formed on an inner surface of a vessel for chemical solution, if a surface of the PTFE sheet obtained by cutting is rough, even if the inside of the vessel is merely washed, a stain, particularly fine particles (called microparticles) remain and contaminate the chemical solution. Therefore in the present invention, it is preferable that before laminating, when laminating or after laminating, a surface of the PTFE sheet which contacts a chemical solution is heat-treated at a temperature of not less than a melting point of PTFE, for example at 340° to 390° C.

This surface smoothing treatment is carried out by heating at a temperature of not less than a melting point of PTFE for a short period of time under no load or under a light load. However attention must be paid so that finally an average specific weight of the PTFE sheet in the laminated article should not lower below 2.175. The surface may be heated by means of a burner or by increasing a temperature of the supporting plate of a heat press (for example, FIG. 1) used for lamination to not less than a melting point of PTFE for a short period of time. Further a method of passing the PTFE sheet on the heating roll for a short period of time can be employed. A heating time is usually from 6 to 60 seconds in case where a heating temperature is 380° C. By the smoothing treatment, a PTFE sheet having a surface roughness (Ra) of not more than 350 nm, usually 100 to 250 nm can be obtained.

Then preferred embodiments of the laminated article of the present invention is explained below, but the present invention is not limited to them.

(1) PTFE sheet: PAVE-modified PTFE. Average specific weight is larger than 2.175.
   Un-sintered PTFE fine particle layer: Coating of PAVE-modified PTFE dispersion
       Average particle size: 0.1 to 0.5 µm
       Coating amount (dry): 15 to 100 g/m$^2$
       Melt energy: not more than 50 J/g
   Heat-meltable resin film: PFA film (melting point: 310° C.)
       Thickness: 10 to 300 µm
   Other material: Woven fabrics of heat resistant glass, carbon, polyamideimide and boron nitride
   Other treatment: Surface smoothing treatment
   Application: Backing sheet for lining of vessel, tank, pipe, etc. for storing and transporting a chemical solution. Particularly a vessel for transporting and storing a chemical solution in production of semi-conductors.
   Effect: Permeability to a chemical solution is low and an amount of sticking microparticles is small since a surface is smooth.

(2) PTFE sheet: PAVE-modified PTFE. Average specific weight is from 2.178 to 2.210.
   Un-sintered PTFE fine particle layer: Film of PAVE-modified PTFE fine particles
       Average particle size: 0.1 to 0.5 µm
       Coating thickness: 10 to 100 µm
       Melt energy: not more than 50 J/g
   Heat-meltable resin film: PFA film (melting point: 310° C.)
       Thickness: 10 to 300 µm
   Other material: Woven fabrics of heat resistant glass, carbon, polyamideimide and boron nitride
   Other treatment: Surface smoothing treatment
   Application: Backing sheet for lining of vessel, tank, pipe, etc. for storing and transporting a chemical solution. Particularly a vessel for transporting and storing a chemical solution in production of semi-conductors.
   Effect: Permeability to a chemical solution is low and an amount of sticking microparticles is small since a surface is smooth.

(3) PTFE sheet: PAVE-modified PTFE. Average specific weight is from 2.178 to 2.210.
   Un-sintered PTFE fine particle layer: Coating of PAVE-modified PTFE dispersion
       Average particle size: 0.1 to 0.5 µm
       Coating amount (dry): 15 to 100 g/m$^2$
       Melt energy: not more than 50 J/g
   Heat-meltable resin film: PFA film (melting point: 310° C.)
       Thickness: 10 to 300 µm
   Other material: Woven fabrics of heat resistant glass, carbon, polyamideimide and boron nitride
   Other treatment: Surface smoothing treatment
   Application: Backing sheet for lining of vessel, tank, pipe, etc. for storing and transporting a chemical solution. Particularly a vessel for transporting and storing a chemical solution in production of semi-conductors.
   Effect: Permeability to a chemical solution is low and an amount of sticking microparticles is small since a surface is smooth.

(4) PTFE sheet: Un-modified PTFE. Average specific weight is from 2.178 to 2.210.
   Un-sintered PTFE fine particle layer: Coating of PAVE-modified PTFE dispersion
       Average particle size: 0.1 to 0.5 µm
       Coating amount (dry): 15 to 100 g/m$^2$
       Melt energy: not more than 50 J/g Heat-meltable resin film: PFA film (melting point: 310° C.)
　　Thickness: 10 to 300 μm
　　Other material: Woven fabrics of heat resistant glass, carbon, polyamideimide and boron nitride
　　Application: Backing sheet for lining of vessel, tank, pipe, etc. for storing and transporting a chemical solution
　　Effect: Permeability to a chemical solution is low.
(5) PTFE sheet: Un-modified PTFE. Average specific weight is from 2.178 to 2.210.
　　Un-sintered PTFE fine particle layer: Film of PAVE-modified PTFE fine particles
　　　Average particle size: 0.1 to 0.5 μm
　　　Coating thickness: 10 to 100 μm
　　　Melt energy: not more than 50 J/g
　　Heat-meltable resin film: PFA film (melting point: 310° C.)
　　　Thickness: 10 to 300 μm
　　Other material: Woven fabrics of heat resistant glass, carbon, polyamideimide and boron nitride
　　Application: Backing sheet for lining of vessel, tank, pipe, etc. for storing and transporting a chemical solution
　　Effect: Permeability to a chemical solution is low.
(6) PTFE sheet: PAVE-modified PTFE. Average specific weight is from 2.178 to 2.210.
　　Un-sintered PTFE fine particle layer: Coating of unmodified PTFE dispersion
　　　Average particle size: 0.1 to 0.5 μm
　　　Coating amount (dry): 15 to 100 g/m²
　　　Melt energy: not more than 50 J/g
　　Heat-meltable resin film: PFA film (melting point: 310° C.)
　　　Thickness: 10 to 300 μm
　　Other material: Woven fabrics of heat resistant glass, carbon, polyamideimide and boron nitride
　　Other treatment: Surface smoothing treatment
　　Application: Backing sheet for lining of vessel, tank, pipe, etc. for storing and transporting a chemical solution. Particularly a vessel for transporting and storing a chemical solution in production of semi-conductors.
　　Effect: Permeability to a chemical solution is low and an amount of sticking microparticles is small since a surface is smooth.
(7) PTFE sheet: PAVE-modified PTFE. Average specific weight is from 2.178 to 2.210.
　　Un-sintered PTFE fine particle layer: Film of un-modified PTFE fine particles
　　　Average particle size: 0.1 to 0.5 μm
　　　Coating thickness: 10 to 100 μm
　　　Melt energy: not more than 50 J/g
　　Heat-meltable resin film: PFA film (melting point: 310° C.)
　　　Thickness: 10 to 300 μm
　　Other material: Woven fabrics of heat resistant glass, carbon, polyamideimide and boron nitride
　　Other treatment: Surface smoothing treatment
　　Application: Backing sheet for lining of vessel, tank, pipe, etc. for storing and transporting a chemical solution. Particularly a vessel for transporting and storing a chemical solution in production of semi-conductors.
　　Effect: Permeability to a chemical solution is low and an amount of sticking microparticles is small since a surface is smooth.
(8) PTFE sheet: Un-modified PTFE. Average specific weight is from 2.178 to 2.210.
　　Un-sintered PTFE fine particle layer: Coating of unmodified PTFE dispersion
　　　Average particle size: 0.1 to 0.5 μm
　　　Coating amount (dry): 15 to 100 g/m²
　　　Melt energy: not more than 50 J/g
　　Heat-meltable resin film: PFA film (melting point: 310° C.)
　　　Thickness: 10 to 300 μm
　　Other material: Woven fabrics of heat resistant glass, carbon, polyamideimide and boron nitride
　　Application: Backing sheet for lining of vessel, tank, pipe, etc. for storing and transporting a chemical solution
　　Effect: Permeability to a chemical solution is low.
(9) PTFE sheet: Un-modified PTFE. Average specific weight is from 2.178 to 2.210.
　　Un-sintered PTFE fine particle layer: Film of un-modified PTFE fine particles
　　　Average particle size: 0.1 to 0.5 μm
　　　Coating thickness: 10 to 100 μm
　　　Melt energy: not more than 50 J/g
　　Heat-meltable resin film: PFA film (melting point: 310° C.)
　　　Thickness: 10 to 300 μm
　　Other material: Woven fabrics of heat resistant glass, carbon, polyamideimide and boron nitride
　　Application: Backing sheet for lining of vessel, tank, pipe, etc. for storing and transporting a chemical solution
　　Effect: Permeability to a chemical solution is low.
(10) PTFE sheet: PAVE-modified PTFE. Average specific weight is from 2.178 to 2.210.
　　Un-molten PFA fine particle layer: Coating of PFA dispersion
　　　Average particle size: 0.1 to 0.5 μm
　　　Coating amount (dry): 15 to 100 g/m²
　　　Melt energy: not more than 50 J/g
　　Heat-meltable resin film: PFA film (melting point: 310° C.)
　　　Thickness: 10 to 300 μm
　　Other material: Woven fabrics of heat resistant glass, carbon, polyamideimide and boron nitride
　　Other treatment: Surface smoothing treatment
　　Application: Backing sheet for lining of vessel, tank, pipe, etc. for storing and transporting a chemical solution. Particularly a vessel for transporting and storing a chemical solution in production of semi-conductors.
　　Effect: Permeability to a chemical solution is low and an amount of sticking microparticles is small since a surface is smooth.
(11) PTFE sheet: Un-modified PTFE. Average specific weight is from 2.178 to 2.210.
　　Un-molten PFA fine particle layer: Coating of PFA dispersion
　　　Average particle size: 0.1 to 0.5 μm
　　　Coating amount (dry): 15 to 100 g/m²
　　　Melt energy: not more than 50 J/g
　　Heat-meltable resin film: PFA film (melting point: 310° C.)
　　　Thickness: 10 to 300 μm
　　Other material: Woven fabrics of heat resistant glass, carbon, polyamideimide and boron nitride
　　Application: Backing sheet for lining of vessel, tank, pipe, etc. for storing and transporting a chemical solution
　　Effect: Permeability to a chemical solution is low.
(12) PTFE sheet: PAVE-modified PTFE. Average specific weight is larger than 2.175.
　　Heat-meltable resin film: PFA film (melting point: 310° C.)
　　　Thickness: 10 to 300 μm Other material: Woven fabrics of heat resistant glass, carbon, polyamideimide and boron nitride Other treatment: Treatment for preventing a rapid temperature lowering after thermo-fusing Application: Backing sheet for lining of vessel, tank, pipe, etc. for storing and transporting a chemical solution. Particularly a vessel for transporting and storing a chemical solution in production of semi-conductors.

Effect: Permeability to a chemical solution is low and an amount of sticking microparticles is small since a surface is smooth.

(13) PTFE sheet: PAVE-modified PTFE. Average specific weight is from 2.178 to 2.210.

Heat-meltable resin film: PFA film (melting point: 310° C.)

Thickness: 10 to 300 μm

Other material: Woven fabrics of heat resistant glass, carbon, polyamideimide and boron nitride Other treatment: To maintain at a temperature of from 300° C. to a temperature less than a melting point of PTFE for 5 to 20 minutes after thermo-fusing Application: Backing sheet for lining of vessel, tank, pipe, etc. for storing and transporting a chemical solution. Particularly a vessel for transporting and storing a chemical solution in production of semi-conductors.

Effect: Permeability to a chemical solution is low and an amount of sticking microparticles is small since a surface is smooth.

Then the present invention is explained by means of examples, but is not limited to them.

EXAMPLE 1

A PAVE-modified PTFE dispersion (melt energy: 40 J/g, average particle size: 0.3 μm, concentration: 65%) prepared by emulsion polymerization was coated by brush coating on one surface of a PTFE sheet (PAVE-modified PTFE sheet having a specific weight of 2.191, width: 200 mm, length: 200 mm, thickness: 3 mm) obtained by sintering by a rotation sintering method (method described in Example 2 of PCT/JP98/01116) and then cutting so that a coating amount of PTFE fine particles would become 30 g/m$^2$ after drying. Then the dispersion was dried. Subsequently a PFA film (width: 200 mm, length: 200 mm, thickness: 0.25 mm) was overlaid on the PTFE fine particle layer and further a heat resistant glass cloth (width: 200 mm, length: 200 mm, thickness: 3 mm) was placed thereon to give a layered article. The layered article was put between the heating plate 5 and the supporting plate 6 shown in FIG. 1 and heated under the conditions that a temperature of the heating plate was 380° C., a temperature of the supporting plate was 300° C. and an applying pressure was 1 kgf/cm$^2$. Four minutes after, the pressure on the heating plate was released and the layered article was slowly cooled down to room temperature over 2 to 3 minutes to give a laminated article (backing sheet) of the present invention.

A sample of 30 mm wide×150 mm long was obtained from the laminated article by cutting it. An adhesive strength (peel strength) between the PTFE sheet and the PFA film of the sample which was measured according to JIS K 6772-9-5 was 3.0 kgf/cm. An average specific weight of the whole PTFE sheet was 2.184. When the cut surface of the PTFE sheet was observed, it was recognized that about 30% from the side of PFA film was transparent due to melting.

Further the obtained laminated article was heat-treated at 360° C. for one minute by a heat press to make a surface of the PTFE sheet smooth, but an average specific weight of the PTFE sheet was maintained high at 2.183.

EXAMPLE 2

A PAVE-modified PTFE sheet (average specific weight: 2.191) was produced by sintering through conventional method and then cutting. Since the sheet was waved, it was subjected to smoothening treatment by heating and pressing at 360° C. for five minutes and the average specific weight lowered to 2.178. A laminated article was produced in the same manner as in Example 1 by laying un-sintered PTFE fine particles, PFA film and heat resistant glass cloth and heating and pressing for two minutes under the same conditions except that the PTFE sheet subjected to smoothening treatment was used. An average specific weight of the PTFE sheet in the laminated article was 2.177, an adhesive strength (peel strength) thereof was 3.2 kgf/cm and a proportion of transparent layer of the cut surface thereof was 10%.

Further the surface of the PTFE sheet was made smooth in the same manner as in Example 1, but the specific weight was 2.176 and was hardly lowered.

EXAMPLE 3

A laminated article was produced in the same manner as in Example 1 by laying un-sintered PTFE fine particles, PFA film and heat resistant cloth and heating and pressing for two minutes under the same conditions except that unmodified PTFE sheet obtained by the rotation sintering method (average specific weight: 2.178) was used. An average specific weight of the PTFE sheet in the laminated article was 2.177, an adhesive strength (peel strength) thereof was 3.2 kgf/cm and a proportion of transparent layer of the cut surface thereof was 10%.

EXAMPLE 4

A laminated article was produced in the same manner as in Example 1 except that un-sintered PTFE dispersion was not coated, a heating and pressing time was extended to 8 minutes and after held on a 305° C. heat press for 8 minutes, a pressure was released and a layered article was slowly cooled to room temperature over 2 to 3 minutes. An average specific weight of the PTFE sheet in the laminated article was 2.177 and an adhesive strength (peel strength) thereof was 3.2 kgf/cm.

COMPARATIVE EXAMPLE 1

A laminated article for comparison was produced by laying and heat-pressing in the same manner as in Example 1 except that an un-sintered PTFE dispersion was not coated. The PFA film could be peeled from the PTFE sheet easily by hand.

COMPARATIVE EXAMPLE 2

A laminated article was produced in the same manner as in Comparative Example 1 except that a heating time was extended to 8 minutes. An adhesive strength (peel strength) of the obtained laminated article was 3.5 kgf/cm. However the PTFE sheet was transparent and an average specific weight was as small as 2.170.

INDUSTRIAL APPLICABILITY

According to the present invention, a PTFE laminated article having a sufficient adhesive strength can be obtained while a specific weight of a PTFE sheet can be maintained high, and a PTFE backing sheet having low permeability to a chemical solution can be provided.

What is claimed is:

1. A laminated article having a heat-fusing layered structure obtained by laminating a polytetrafluoroethylene sheet having an average specific weight of not less than 2.175 and a heat resistant woven fabric by interposing a heat-meltable resin layer therebetween, wherein said polytetrafluoroethylene sheet of said laminate has an average specific weight of not less than 2.175 and said polytetrafluoroethylene is polytetrafluoroethylene modified with perfluoro(alkyl vinyl ether).

2. The laminated article of claim 1, wherein the laminated article is a backing sheet.

3. The laminated article of claim 1, wherein an adhesive strength between the polytetrafluoroethylene sheet and the heat-meltable resin layer is not less than 2 kgf/cm in a peel strength.

4. The laminated article of claim 1, wherein said polytetrafluoroethylene sheet comprises a high specific weight layer having a specific weight exceeding 2.175 and a low specific weight layer having a specific weight lower than that of the high specific weight layer.

5. The laminated article of claim 1, wherein said heat-meltable resin is a heat-meltable fluorine-containing resin.

6. The laminated article of claim 5, wherein said heat-meltable fluorine-containing resin is a tetrafluoroethylene/perfluoro(alkyl vinyl ether) copolymer.

7. A laminated article having a heat-fusing layered structure comprising a polytetrafluoroethylene sheet having an average specific weight of not less than 2.175 and a heat-meltable resin layer, wherein said polytetrafluoroethylene sheet of said laminate has an average specific weight of not less than 2.175 and said polytetrafluoroethylene is polytetrafluoroethylene modified with perfluoro(alkyl vinyl ether), and wherein said polytetrafluoroethylene sheet comprises a high specific weight layer having a specific weight exceeding 2.175 and a low specific weight layer having a specific weight lower than that of the high specific weight layer.

* * * * *